Patented May 20, 1930

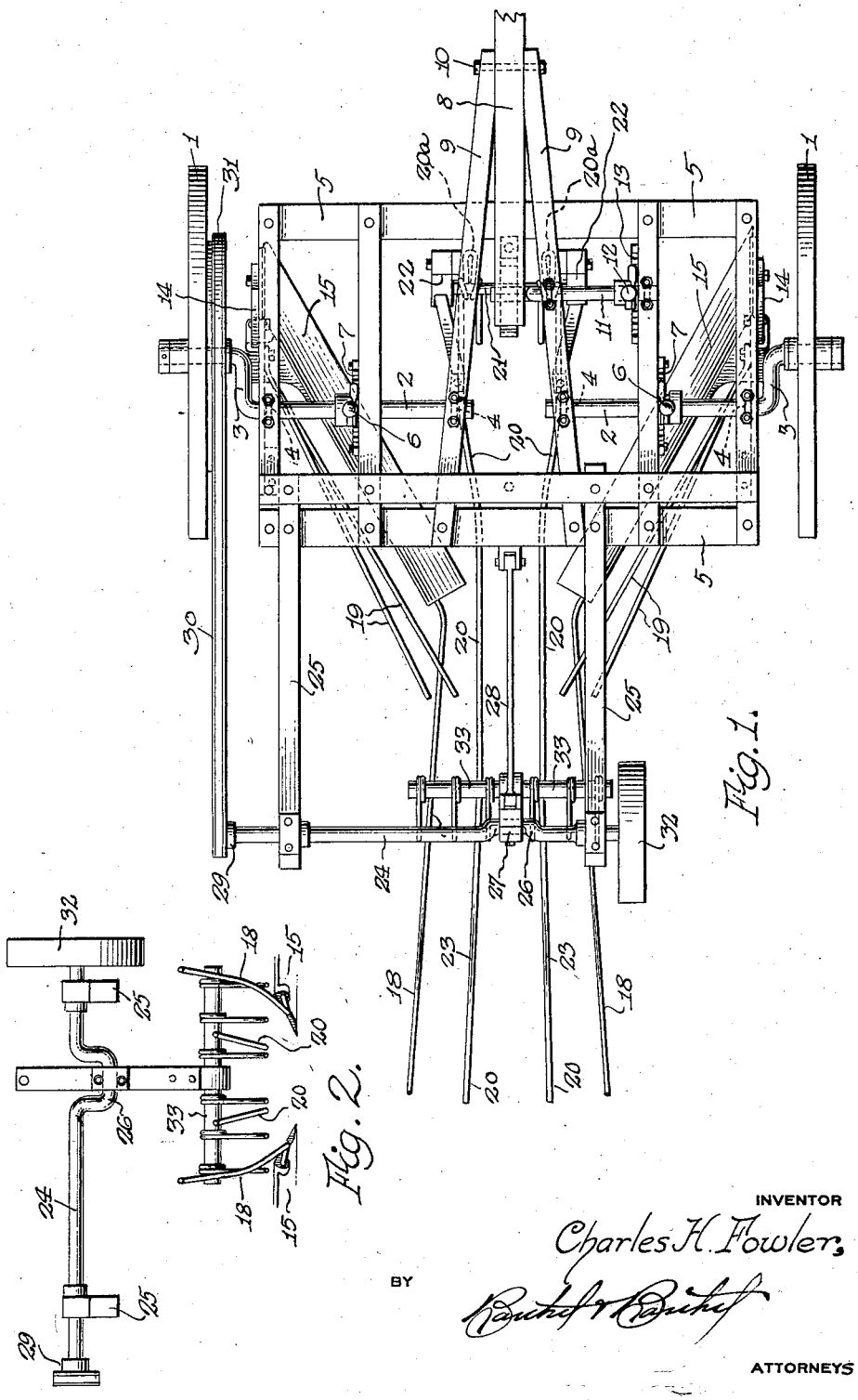

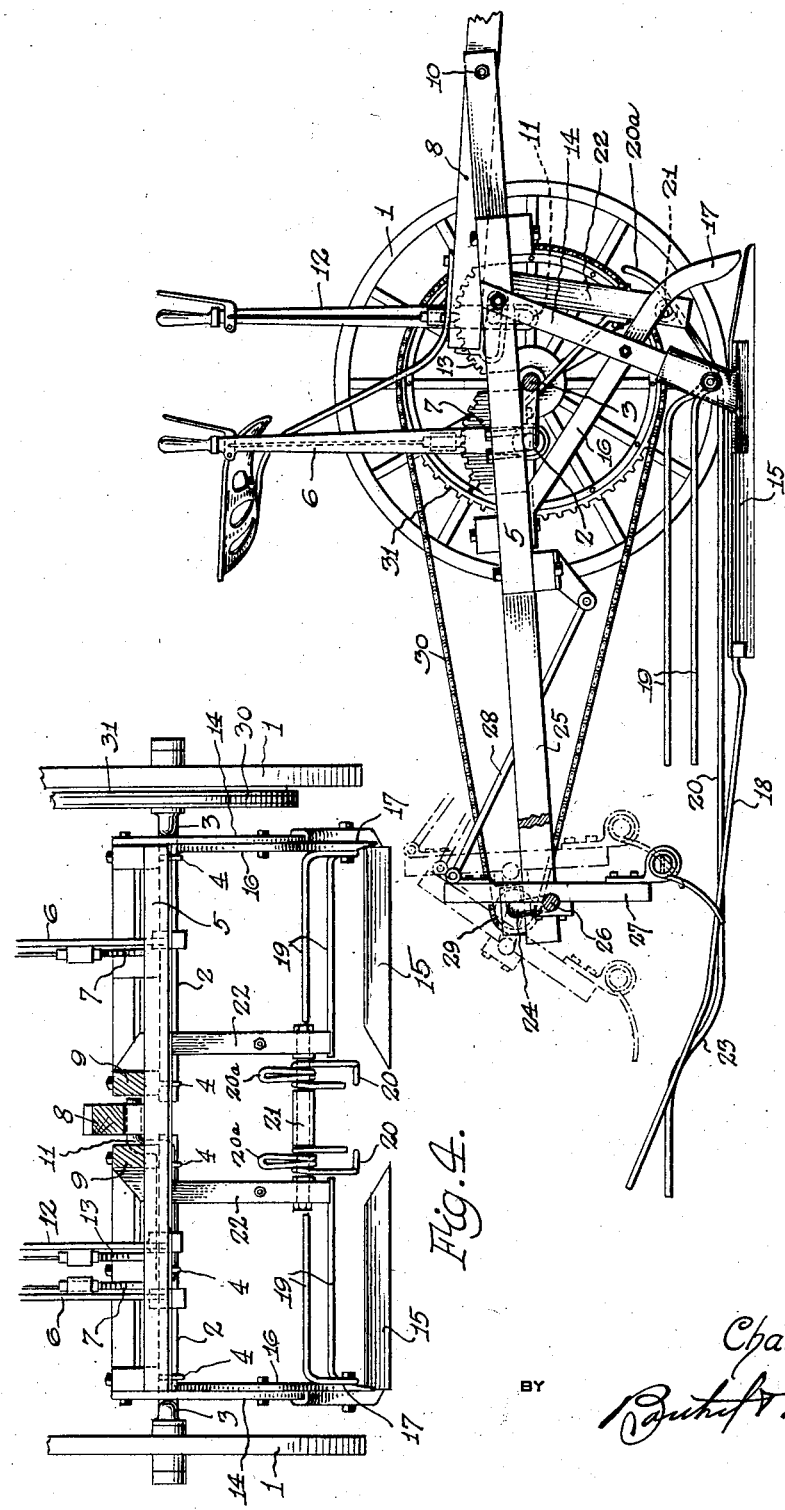

1,759,741

UNITED STATES PATENT OFFICE

CHARLES H. FOWLER, OF MATHERTON, MICHIGAN

VINE CUTTER OR BEAN PULLER

Application filed February 25, 1929. Serial No. 342,355.

This invention relates to a machine for use in harvesting beans or other viny growths, and its object is to remove the plants from the ground, shake them free from dirt, and deposit them in windrows upon the surface of the ground. A further object is to provide a machine of simple construction for the purpose having certain new and useful features in the construction, combination and arrangement of parts.

With the above and other ends in view, the invention consists in the matters hereinafter set forth and more particularly pointed out in the appended claims, reference being had to the accompanying drawings, in which—

Figure 1 is a plan view of a machine illustrative of an embodiment of the present invention;

Fig. 2 is a detail view of a lifting fork showing its relation to cutter blades and gathering fingers or rods;

Fig. 3 is a side elevation of Fig. 1 with portions broken away and in section; and Fig. 4 is a front end elevation of Fig. 3.

The machine embodying the present invention includes the usual ground wheels 1 mounted upon the ends of a divided axle comprising two separate crank shafts 2 with the crank portions 3 of the shafts adjacent the wheels and the straight portions mounted in bearings 4 on a rectangular frame 5 with each shaft 2 held against rotation in its bearings by means of a hand lever 6 rigidly secured to each shaft and each hand lever provided with the usual latch or dog to engage a notched sector 7 secured to the frame. Each wheel may therefore be adjusted relative to the frame to raise or lower the frame by turning the crank shafts 2 by means of the hand levers, all as commonly arranged in farm machinery of this character. The machine is also provided with a tongue 8 common to horse-drawn machines, which tongue is secured to the frame 5 between forwardly extending bars 9 by means of a pivot bolt 10 with its rear end connected to the crank of a crank shaft 11 mounted on the frame and provided with a hand lever 12 for turning said shaft, said lever being provided with the usual latch for engaging the notches in a sector 13 secured to the frame. The tongue 8 may therefore be turned on its pivot 10 to raise or lower its forward end relative to the frame 5 by turning the shaft 11, all arranged in the usual manner to provide the proper adjustment to suit the conditions of use.

Bolted to the frame 5 adjacent the wheels, are downwardly and rearwardly extending bracket arms 14 and secured to the lower ends of these arms are blades 15 which extend in a horizontal position forwardly and rearwardly of the machine and in a rearwardly convergent relation with their advance sharp edges arranged to cut just beneath the surface of the ground when the machine is in operation. Brace bars 16 are bolted to the frame at their upper ends and intermediate their ends to the brackets 14 to brace said brackets and are extended forwardly of said brackets and curved downwardly toward the forward ends of the blades 15, said forward ends 17 of said bars presenting sharp forward edges to cut and divide the vines forwardly of the blades.

Secured to the rear ends of the blades 15 are rods 18 which are bent upwardly as they extend rearwardly and serve to lift the vines after they have been cut off or pulled up by the blades 15, and these rods also serve as a track or support for the vines upon which they are vibrated by the vibration of these rods to shake the dirt from the vines. Gathering rods 19 are secured at their forward ends to the bracket arms 14 just above the blades and extend rearwardly in parallel spaced relation adjacent to and above the rear edges of the blades converging rearwardly and thus serving to bring or gather the severed vines toward the center line of the path of travel of the machine and deposit them upon the vibrator rods 18 and also upon floating rods 20 which are pivotally attached at their forward ends to a cross bar 21 suspended from the frame 5 by legs 22 extending downwardly from the frame just forwardly of the forward ends of the blades 15, said rods being looped adjacent their forward ends with said loops passed around said bar to pivotally attach them thereto with the loops extended upwardly and forwardly of said bar to form guards 20ª for preventing the vines from catching and bunching up between said bars 22. These rods 20 being pivotally attached to the cross bars 21, at their forward ends, trail or float upon the surface of the ground, and each rod is bent upwardly as at 23 near its rear end to lift the vines which have been pulled by the blades 15 and thrown or gathered along the center line of the path of travel of the machine and upon these floating rods 20, the bends at the rear ends of the bars serving to lift the vines and the vibration of which bars serves to shake the dirt from the vines.

To further assist in lifting, agitating and depositing the vines in a loose windrow rearwardly of the machine, a crank shaft 24 is supported in bearings upon the rear ends of rearwardly extending bars 25 secured to the frame; and mounted upon the crank portion 26 of this shaft, is a rocker bar 27 pivotally attached thereto to turn freely thereon and to the upper end of this rocker is pivotally attached the rear end of a rod 28 which is pivotally attached to the frame at its forward end. The shaft 24 is rotated by means of a sprocket wheel 29 on one end thereof which sprocket is engaged by a sprocket chain 30 passing over a large sprocket 31 secured to one of the ground wheels 1. Forward progress of the machine thus imparts rotary motion to the shaft 24 which is provided with a balance wheel 32 on its end opposite that provided with the sprocket, and the crank 26 of the shaft thus imparts a swinging movement, forward, downward, rearward and upward, to the rocker bar 27 to the lower end of which is attached a series of spring fingers or tines together forming a fork 33 for picking up and throwing rearwardly the vines in the windrow, said fork being located rearwardly of the rear ends of the gathering rods 19 and in the path of vines passing between said ends. This fork is also preferably located just forwardly of the upward bends 23 in the floating rods 20, the path of movement of the fork corresponding somewhat to these bends, and thus the vines after being cut below the surface of the ground by the blades 15, are gathered into a windrow and then lifted and thrown by the fork into loose bunches in a row upon the top of the ground in a condition to quickly dry out and to then be gathered.

The principle of operation is disclosed in the embodiment shown in the accompanying drawings but it is obvious that changes falling within the scope of the appended claims, may be made without departing from the spirit of the invention which resides in the combination of instrumentalities so arranged, in a machine for the purpose, as to accomplish the ends in view.

Having thus fully described my invention, what I claim is:—

1. A vine harvesting machine including means for loosening the vines from the ground, rearwardly converging rods for gathering the loosened vines into a windrow, trailing rods upon which the vines are deposited by said gathering rods, said trailing rods being free to vibrate and shake the dirt from the vines, a fork supported above said windrow, and means for imparting to said fork a rearward and downward motion to lift the vines and deposit the same in a loose windrow on top of the ground.

2. A bean vine harvesting machine including blades adapted to cut beneath the surface of the ground and loosen the vines, gathering members for gathering the loosened vines into a windrow, agitating members beneath the vines having upwardly extending rear end portions to lift the vines, a crank, a rocker bar carried by said crank and pivotally limited in its forward and rearward swinging movement at its upper end, a fork carried by the lower end of said rocker bar, and means for imparting rotation to said crank.

3. A bean vine harvesting machine including a frame, ground wheels supporting said frame, blades carried by the frame to cut beneath the surface of the ground and loosen the vines, rods pivotally attached to said frame to trail upon the ground rearwardly of said blades, means for gathering the loosened vines and depositing them upon said pivoted rods, a crank shaft on the frame, means for transmitting motion from one of the ground wheels to turn said shaft, a rocker bar mounted intermediate its ends upon the crank of said crank shaft for pivotal movement thereon, a rod pivotally attached at one end to the upper end of said rocker bar and at its opposite end to said frame, and a fork on the lower end of said rocker bar.

4. A bean vine harvesting machine including a frame, ground wheels for supporting said frame, brackets on the frame adjacent each side thereof, blades on the lower ends of said brackets extending rearwardly in convergent relation to cut beneath the surface of the ground and loosen the vines, gathering members attached at their forward ends to said brackets and converging rearwardly, rods pivotally connected at their forward ends to the frame forwardly of said blades and floating upon the ground rearwardly thereof, said rods being upwardly bent adjacent their rear ends, a crank shaft mounted transversely of said frame in bearings thereon, means for transmitting motion from one of said ground wheels to turn said shaft, a rocker bar pivotally mounted intermediate its ends on the crank of said crank shaft, a rod pivotally attached at one end to the upper end of said rocker bar and at its opposite end to said frame, and a fork comprising a plurality of tines secured to the lower end of said rocker bar.

In testimony whereof I affix my signature.

CHARLES H. FOWLER.